United States Patent Office 3,037,022
Patented May 29, 1962

---

3,037,022
N-(DIHYDROXYPYRIDAZINYL)ANILINE AND DERIVATIVES THEREOF
Harman S. Lowrie, Northbrook, Ill., assignor to G. D. Searle & Co., Chicago, Ill., a corporation of Delaware
No Drawing. Filed Sept. 7, 1960, Ser. No. 54,377
10 Claims. (Cl. 260—250)

The present invention relates to pyridazine derivatives of aniline of the formula

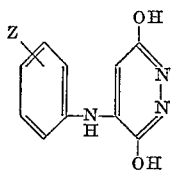

wherein Z is hydrogen, alkyl, (alkyl)oxy and halogen. Among the alkyl radicals referred to above, especially lower alkyl radicals are preferred, for examply, methyl, ethyl, propyl, isopropyl, butyl, isobutyl, sec-butyl, tert-butyl, pentyl, isopentyl, tert-pentyl, neopentyl, hexyl, isohexyl, heptyl, and octyl. Among the halogens referred to above, especially halogen of atomic weight less than 80 is preferred.

The compounds to which this invention relates possess valuable pharmacological properties. In particular, they possess appetite inhibiting and diuretic activity.

The compounds of the present invention are conveniently prepared by condensation of a suitably substituted aniline with 4-chloro-3,6-dihydroxy-pyridazine in the presence of copper powder.

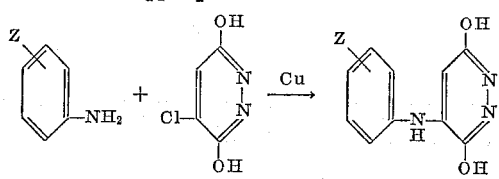

In the equation Z has the significance hereinbefore assigned.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

EXAMPLE 1

*N-[4-(3,6- Dihydroxypyridazinyl)] Aniline*

A mixture of 100 parts of 4-chloro-3,6-dihydroxypyridazine, 500 parts of aniline and one part of copper powder is heated rapidly to reflux temperature. Reflux is maintained by the heat of reaction for about 10 minutes, and by heating for an additional 15 minutes. At the end of this time the reaction mixture is allowed to cool to room temperature, and then diluted with an equal volume of ether. The mixture thus obtained is extracted several times with dilute aqueous potassium hydroxide, and the extracts are back-extracted with ether, and acidified with concentrated hydrochloric acid. The resultant solid material is removed by filtration, washed with water on the filter, and recrystallized from methanol to give N-[4-(3,6-dihydroxypyridazinyl)]-aniline, as tan crystals, melting at 262–264°, with decomposition. The structure may be expressed as

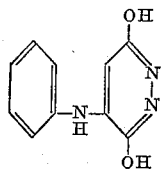

EXAMPLE 2

*N-[4-(3,6-Dihydroxypyridazinyl)]-4-Methylaniline*

Substitution of 500 parts of p-toluidine for the aniline of Example 1 gives, by the procedure therein detailed, N-[4-(3,6-dihydroxypyridazinyl)]-4-methylaniline, melting at 247–249° with decomposition. The structure may be expressed as

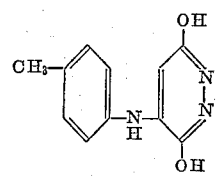

EXAMPLE 3

*N-[4-(3,6-Dihydroxypyridazinyl)]-4-Ethylaniline*

Substitution of 500 parts of p-ethylaniline for the aniline of Example 1 gives, by the procedure therein detailed, N-[4-(3,6-dihydroxypyridazinyl)]-4-ethylaniline.

EXAMPLE 4

*N-[4-(3,6-Dihydroxypyridazinyl)]-4-Methoxyaniline*

Substitution of 500 parts of p-anisidine for the aniline of Example 1 gives, by the procedure therein detailed, N-[4-(3,6 - dihydroxypyridazinyl)]-4-methoxyaniline melting at 225–230° with decomposition. The structure may be expressed as

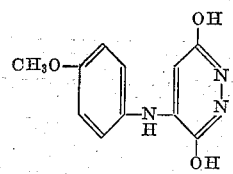

EXAMPLE 5

*N-[4-(3,6-Dihydroxypyridazinyl)]-4-Ethoxyaniline*

Substitution of 500 parts of p-phenetidine for the aniline of Example 1 gives, by the procedure therein detailed, N-[4-(3,6-dihydroxypyridazinyl)]-4-ethoxyaniline.

EXAMPLE 6

*N-[4-(3,6-Dihydroxypyridazinyl)]-4-Fluoroaniline*

Substitution of 500 parts of p-fluoroaniline for the aniline of Example 1 gives, by the procedure therein detailed, N-[4-(3,6-dihydroxypyridazinyl)]-4-fluoroaniline, melting at 272–274° with decomposition. The structure may be expressed as

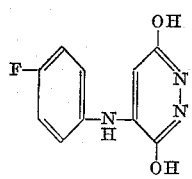

EXAMPLE 7

*N-[4-(3,6-Dihydroxypyridazinyl)]-4-Chloroaniline*

Substitution of 500 parts of p-chloroaniline for the aniline of Example 1 gives, by the procedure therein detailed, N-[4-(3,6-dihydroxypyridazinyl)]-4-chloroaniline, melting at 276–278° with decomposition. The structure may be expressed as

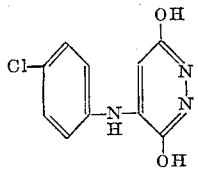

EXAMPLE 8

*N-[4-(3,6-Dihydroxypyridazinyl)]-4-Bromoaniline*

Substitution of 500 parts of p-bromoaniline for the aniline of Example 1 gives, by the procedure therein detailed, N-[4-(3,6-dihydroxypyridazinyl)]-4-bromoaniline.

EXAMPLE 9

*N-[4-(3,6-Dihydroxypyridazinyl)]-3-Methylaniline*

Substitution of 500 parts of m-toluidine for the aniline of Example 1 gives, by the procedure therein detailed, N-[4-(3,6-dihydroxypyridazinyl)]-3-methylaniline.

EXAMPLE 10

*N-[4-(3,6-Dihydroxypyridazinyl)]-3-Ethylaniline*

Substitution of 500 parts of m-ethylaniline for the aniline of Example 1 gives, by the procedure therein detailed, N-[4-(3,6-dihydroxypyridazinyl)]-3-ethylaniline.

EXAMPLE 11

*N-[4-(3,6-Dihydroxypyridazinyl)]-3-Methoxyaniline*

Substitution of 500 parts of m-anisidine for the aniline of Example 1 gives, by the procedure therein detailed, N-[4-(3,6-dihydroxypyridazinyl)]-3-methoxyaniline.

EXAMPLE 12

*N-[4-(3,6-Dihydroxypyridazinyl)]-3-Ethoxyaniline*

Substitution of 500 parts of m-phenetidine for the aniline of Example 1 gives, by the procedure therein detailed, N - [4-(3,6-dihydroxypyridazinyl)]-3-ethoxyaniline.

EXAMPLE 13

*N-[4-(3,6-Dihydroxypyridazinyl)]-3-Fluoroaniline*

Substitution of 500 parts of m-fluoroaniline for the aniline of Example 1 gives, by the procedure therein detailed, N-[4-(3,6-dihydroxypyridazinyl)]-3-fluoroaniline.

EXAMPLE 14

*N-[4-(3,6-Dihydroxypyridazinyl)]-3-Chloroaniline*

Substitution of 500 parts of m-chloroaniline for the aniline of Example 1 gives, by the procedure therein detailed, N-[4-(3,6-dihydroxypyridazinyl)]-3-chloroaniline, melting at 259–262°.

EXAMPLE 15

*N-[4-(3,6-Dihydroxypyridazinyl)]-3-Bromoaniline*

Substitution of 500 parts of m-bromoaniline for the aniline of Example 1 gives, by the procedure therein detailed, N-[4-(3,6-dihydroxypyridazinyl)]-3-bromoaniline.

What is claimed is:

1. A compound of the formula

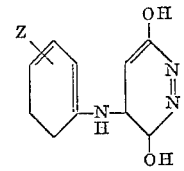

wherein Z is a member of the class consisting of hydrogen, lower alkyl, (lower alkyl)oxy and halogen of atomic weight less than 80.

2. N-[4-(3,6-dihydroxypyridazinyl)]aniline.

3. A compound of the formula

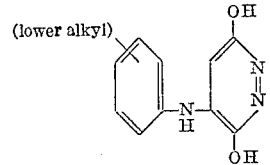

4. N-[4-(3,6-dihydroxypyridazinyl)]-4-methylaniline.

5. A compound of the formula

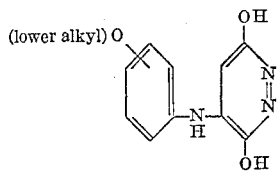

6. N-[4-(3,6-dihydroxypyridazinyl)]-4-methoxyaniline.

7. A compound of the formula

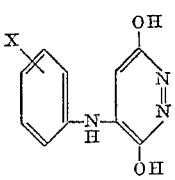

wherein X is halogen of atomic weight less than 80.

8. N-[4-(3,6-dihydroxypyridazinyl)]-4-fluoroaniline.
9. N-[4-(3,6-dihydroxypyridazinyl)]-4-chloroaniline.
10. N-[4-(3,6-dihydroxypyridazinyl)]-3-chloroaniline.

No references cited.